United States Patent [19]

Kammel et al.

[11] 4,144,148

[45] Mar. 13, 1979

[54] METHOD AND APPARATUS FOR TREATING METAL CONTAINING WASTE WATERS

[75] Inventors: Roland Kammel; Hans-Wilhelm Lieber, both of Berlin, Fed. Rep. of Germany

[73] Assignee: Gotzelmann KG, Industriebwasser-Anlagen, Fed. Rep. of Germany

[21] Appl. No.: 902,261

[22] Filed: May 2, 1978

[30] Foreign Application Priority Data

May 3, 1977 [DE] Fed. Rep. of Germany ....... 2719667
Dec. 22, 1977 [DE] Fed. Rep. of Germany ....... 2757271

[51] Int. Cl.² .............................................. C02C 5/12
[52] U.S. Cl. .................................... 204/149; 204/152; 204/199; 204/201; 204/213; 204/280
[58] Field of Search ............... 204/1 R, 149, 152, 199, 204/201, 213, 280

[56] References Cited

U.S. PATENT DOCUMENTS 3,888,756 6/1975 Teshima et al. ................. 204/149 X
3,893,900 7/1975 Teshima et al. ................. 204/149 X
4,072,596 2/1978 Moeglich ......................... 204/149 X

FOREIGN PATENT DOCUMENTS 46691 5/1971 Australia.
1642516 4/1966 Fed. Rep. of Germany.

Primary Examiner—Arthur C. Prescott
Attorney, Agent, or Firm—Spencer & Kaye

[57] ABSTRACT

Method for treating metal containing waste water employing a vessel containing the waste water in which there is provided at least one anode and a cathode comprised of a plurality of electrically conductive elements and in which the waste water is subjected to electrolysis during which the cathode elements are being moved. The cathode elements are provided in the form of rods which are arranged in the vessel by means of at least two holding devices so that the rods extend parallel to one another and can be moved in the holding devices relative to one another. The holding devices are moved during the electrolysis process so that the rods strike one another again and again at spaced intervals. An apparatus is provided for practicing the method.

12 Claims, 6 Drawing Figures

METHOD AND APPARATUS FOR TREATING METAL CONTAINING WASTE WATERS

BACKGROUND OF THE INVENTION

The present invention relates to a method for treating metal containing waste water while employing a vessel containing the waste water in which at least one anode and one cathode are disposed, the cathode comprising electrically conductive elements and in which the waste water is subjected to electrolysis during which the cathode elements are being moved and to an apparatus for practicing the method. See Australian Patent No. 46,691, which discloses a similar process using electrically conductive particles as the cathode elements.

Waste waters in the sense of the present invention are understood to mean all metal containing solutions obtained during technical processing. Such solutions are, for example, waste waters from mines, final liquors, wash waters, trickling waters, rinse waters from tanneries, electroplating operations, the manufacture of printed circuits, film developing, etc. Electrolytic processes have been in use for a long time for the recovery of metals from such solutions having a relatively high metal content, so-called concentrates and semiconcentrates. In this way, it is possible to directly cathodically separate a major portion of the metal content of such solutions and to reduce the metal content of the solutions. When a certain reduced metal content is reached, however, the current efficiency drops considerably, and further reduction in the metal concentration of the solutions is practically unattainable. The then remaining solutions cannot be economically processed with the aid of ion exchangers, since the requirement for regenerating chemicals for the ion exchanger would be unduly high and the resulting heavy salting of the waste water would constitute an additional stress on the environment.

In order to further reduce the residual metal content in the solution, it has often been proposed to improve the cathodic deposition conditions. Such proposals are essentially directed to reducing the depletion of the electrolyte of depositable metal ions in the region of the cathode. Thus, various types of electrolytic cells are known which contain spatially fixed, firmly contacted, quasi two-dimensional electrodes which are frequently arranged vertically, but which can also have another orientation. A relative movement of the electrodes with respect to the electrolyte serves to improve deposition conditions.

Movement of the electrodes can be realized by vibration. The electrodes may be designed to have a disc, ring or cylindrical shape, and may be rotated in the electrolyte. Further, the exterior configuration of the electrodes may contribute to the fact that the electrolyte flows against the electrode surface at high speed and, if possible, not merely in a laminar manner. The electrolyte may also be pumped through channel type electrolysis cells, and may flow vertically through concentrically arranged electrodes with gases being blown in simultaneously. The vertical movement of the liquid may be so intensive that glass beads or other particles of various materials are stirred up and improve the mass transfer at the vertical electrodes.

In order to realize a higher space-time yield during electrolytic processes, numerous efforts have been directed at building up three-dimensional electrodes from electrically conductive bulk material. Such particle piles are called fixed beds if the relative movement with respect to the electrolyte is effected by passing the electrolyte through the bed, either in the direction of the electric field lines or normally thereto.

Australian Patent No. 46,691 discloses a process as described above. At least one stirrer is provided to mechanically move a cathode composed of conductive particles disposed at the bottom of the vessel through which the electrolyte flows. In this process, the anode may also be constituted by electrically conductive particles and is disposed above the cathode pile. Nevertheless the cathode pile has dead spaces and potential free zones in which the electrolytically deposited metal is chemically redissolved in part. A further drawback of this process is the substantial amount of energy required and the resulting intensive heating of the electrolyte. In order to prevent too great a rise in temperature, the electrolyte must therefore be cooled at the cost of additional energy.

SUMMARY OF THE INVENTION

It is an object of the present invention to provide a method for treating metal containing waste waters with which it is possible in a simple, practically continuous manner to attain almost complete recovery of the metals contained in the waste waters in a safe and energy conserving manner.

A further object of the present invention is to provide an apparatus for treating metal containing waste waters.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for treating metal containing waste water employing a vessel containing the waste water in which there is provided at least one anode and a cathode comprised of a plurality of electrically conductive elements and in which the waste water is subjected to electrolysis during which the cathode elements are being moved, comprising: providing the cathode elements in the form of rods; arranging the rods in the vessel by means of at least two holding devices so that the rods extend parallel to one another and can be moved in the holding devices relative to one another; and moving the holding devices during the electrolysis so that the rods strike one another again and again at spaced intervals.

With such a process it is possible, as has been proven in practice, to almost completely demetallize metal-containing waste waters, where the metals are recovered without the use of chemicals in a form enabling them to be reused directly. The process according to the invention can be used with great advantage, particularly where known processes have already failed, i.e., with diluted, but still metal-containing waste waters.

Since the rods of the cathode strike one another again and again, the deposited layers of metal are continuously separated from the rods so that continuous operation is assured. Due to the use of rods for the cathode, defined contacting of these cathode elements is possible since in this case relatively few heavy metal rods can be guided in space with great accuracy. It is thus possible to make electrical contacts by means of current leads having a small contacting surface and high areal compression which results in very low transfer resistances and thus a low voltage requirement. Furthermore, the anodes can be brought very close to the cathode. This simple structure for practicing the method according to the present invention results in low energy requirements and consequently relatively little heating of the electrolyte. Cooling of the electrolyte during the process is no longer necessary. As a whole, the present invention provides for a process which operates with simple means and, due to its simplicity, low energy requirement and elimination of cooling, it operates extremely economically. Furthermore, due to low energy requirement, it is possible to use, for example, rectifiers which are available anyhow for the electrochemical operations.

In another aspect of the present invention, apparatus is provided for treating metal containing waste water employing a vessel containing the waste water in which there is provided at least one anode and a cathode comprised of a plurality of electrically conductive elements and in which the waste water is subjected to electrolysis during which the cathode elements are being moved, comprising: a vessel to accommodate metal containing waste water; a plurality of rods which serve as the electrically conductive elements; and at least two movable holding devices in the vessel for holding the rods parallel to one another and enabling the rods to be movable in the holding devices relative to one another. Each holding device preferably comprises two concentric rings between which the rods are disposed.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

DETAILED DESCRIPTION OF THE INVENTION

Figure 1:
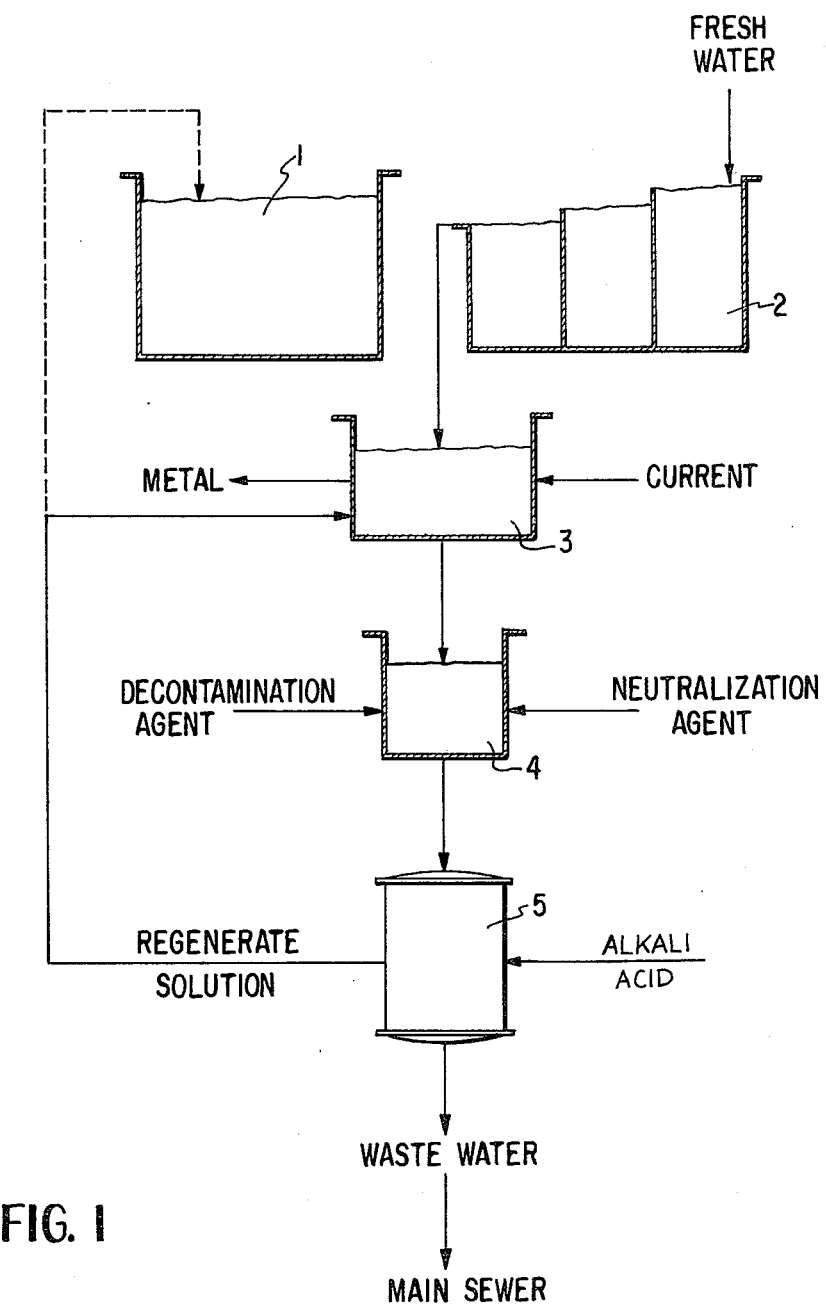
FIG. 1 is a schematic representation of the use of the waste water treating process according to the present invention in conjunction with an electroplating process which is producing the waste water.

The electrolytic demetallization process of the present invention makes it possible to almost completely demetallize metal-containing waste waters. Thus, it is possible to treat diluted solutions containing, for example, about 1 gram of metal per liter to obtain an electrolytically demetallized waste water containing a few mg of metal per liter.

Electrolytic demetallization of the waste water down to a few mg/l, however, is not always necessary, and accordingly it is sufficient in some cases to practice the method of the present invention in a not quite so optimum manner, if the metal content of the waste water needs to be reduced only to such an extent that the remainder of the metal can be removed simply and economically by ion exchange. Complete decontamination and preneutralization of the substantially demetallized waste waters requires only small quantities of chemicals which coincide with the theoretically required amounts. Due to the substantially electrolytic demetallization of the waste water, only a small system capacity is required for the removal of the remainder of the metals, e.g. by means of a fixed bed ion exchanger. The solutions rich in metals which develop during regeneration of the ion exchanger can be selectively returned to the process in which the waste waters were produced or into the electrolysis vessel.

By constructing the cathode of mutually parallel rods which in principle are freely movable with respect to one another, there results an advantageous distribution of the electric field so that it is possible with the process according to the present invention to separate not only electropositive metals, such as gold, silver, copper or bismuth, but just as well, for example, nickel, cadmium and zinc from diluted waste waters down to a very low residual content. In this way, the electrolytic treatment of diluted metal-containing waste waters can be used over a broad field of application and the problem of sludge which is otherwise connected with the processing of waste waters can be solved in an environmentally advantageous and yet economical manner with respect to contaminating heavy metals.

In the prior art particle cathodes, be they moved mechanically or as a fluidized bed, the metal is deposited on the particles whose size increases and the particles need be exchanged at regular intervals. In the process according to the present invention, however, the rods are arranged so that they are periodically subjected to a falling movement. In this way, it is accomplished that the metal deposit peels or flakes off from the rods and falls through onto the bottom of the vessel or onto a collection device, such as a trough or the like, disposed in the vessel. The peeled or flaked off parts or particles can be removed hydraulically or mechanically from the vessel bottom or from the collecting device which is disposed in the vessel.

According to a further embodiment of the present invention, the efficiency of the process can be improved considerably by removing from the vessel during the electrolysis process the particles of the metal layers deposited on the rods, which are separated due to the impacts of the rods and drop to the bottom of the vessel, by means of rotating streams of liquid which are directed to the bottom of the vessel.

The peeled or flaked off metal particles separated from the rods drop to the bottom of the vessel by gravity forces and remain lying there. During the electrolysis process, these particles are removed from the vessel so that they cannot be redissolved again. The metal which has been electrolytically deposited from the waste water is thus removed from the electrolysis cell during the course of the process so that the desired removal of metallic residues from the waste waters is speeded up and quickly leads to very low, no longer harmful residual contents. Since the removal of the flaked off particles is effected hydraulically, it can be assured at the same time that these particles are not smeared against the bottom of the vessel as would happen if wipers were used.

Circulating streams of liquid for removing solid bodies from the bottom of a vessel are known in principle from German Offenlegungsschrift No. 16,42,516. This known process intends to prevent, in a deflocculation basin, deposits from forming at the bottom of the basin. For this purpose, streams of water are used which are dimensioned so that products already deposited at the bottom are whirled upwards and can be returned to the suspended state. Thus, this known process intends to produce exactly the opposite result as the present invention.

Referring now to FIG. 1, there is shown an electroplating bath 1 in which workpieces are treated. The treated workpieces are subsequently rinsed three times in a rinsing cascade 2. Instead of the rinsing cascade 2, or in addition thereto, any other rinsing system, such as a spray rinse tank, suited for increasing concentration can be used. Waste water overflows from rinsing cascade 2 and is substantially demetallized with the aid of a demetallization device 3, explained in greater detail hereafter. Waste water leaving demetallization device 3 can then be conducted into a decontamination and preneutralization vessel 4 in which, for example, remaining cyanide in the waste water is oxidized and the pH of the waste water is set to be weakly acid. Thereafter, the waste water can be passed through an ion exchanger 5 which it leaves completely demetallized.

In the demetallization device 3, the majority of the metals contained in the waste water are cathodically deposited by the electrolysis current and are thus metallically recovered. The substantially demetallized waste water can, if required, be decontaminated and preneutralized in the decontamination and preneutralization vessel 4 by the addition of decontamination and neutralization agents. It is then conducted through the ion exchanger 5 and reaches the main sewer in a demetallized, decontaminated state and with neutral pH. The ion exchanger 5 is regenerated with an acid and/or base and the solution, rich in metals which develops during the regeneration, is returned to the demetallization device 3 or, if possible, to the electroplating bath 1.

Figure 2:
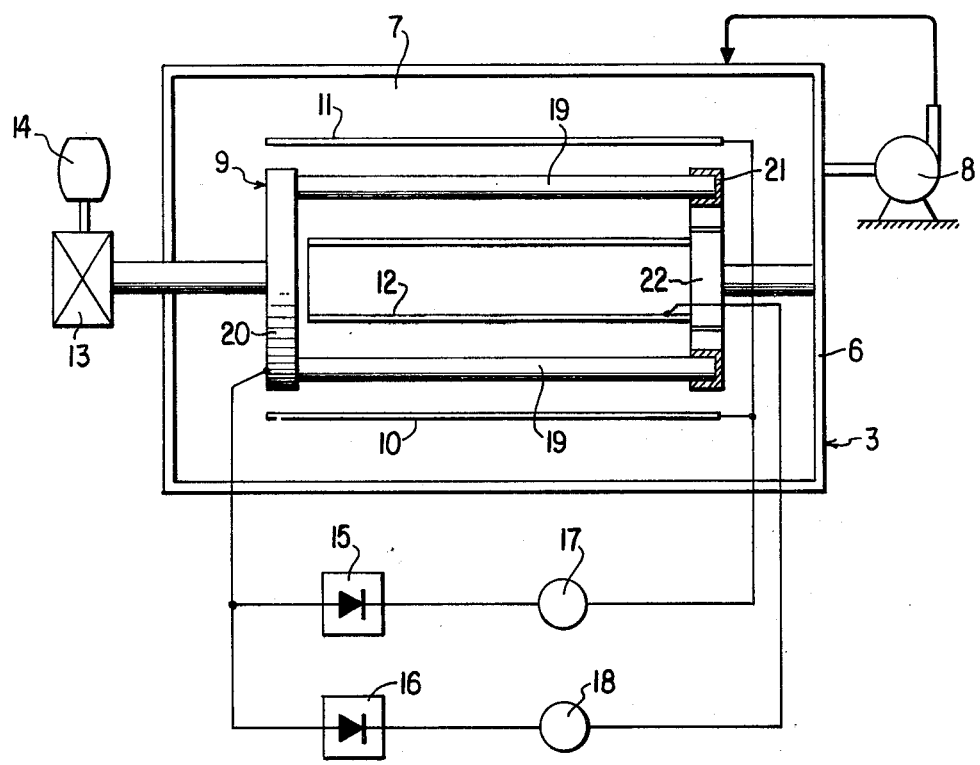
FIG. 2 is a schematic top view of an apparatus for the electrolytic deposition of metals from diluted waste waters in accordance with the teachings of the present invention.

An embodiment of a demetallization device 3 suitable for practicing the method according to the invention is shown to a larger scale in FIG. 2.

Referring to FIG. 2, the waste water 7 to be treated is disposed in a schematically shown vessel 6. Vessel 6 is connected to a pump 8 via pipelines through which the waste water is pumped out of the vessel and back in again in a closed circuit. A cathode 9 is provided in vessel 6 and includes a plurality of electrically conductive elements as described in detail hereafter. External anodes 10 and 11 are disposed on both sides of cathode 9, and an internal anode 12 is disposed within cathode 9.

Cathode 9 is movably disposed in vessel 6 and can be rotated, for example, via gears 13 by means of an electromotor 14. Two rectifiers 15 and 16, with variable direct voltage, are provided for the electrolysis process. The current of the internal circuit, including cathode 9 and internal anode 12, is indicated at an ammeter 17. The current of the external circuit, including anodes 10 and 11, can be set at an ammeter 18. The current densities of the two circuits can thus be set separately. It is also possible, however, to connect all anodes in parallel and to operate with only one rectifier.

According to the present invention, cathode 9 comprises a larger number of electrically conductive rods 19 which are made, for example, of a high-grade steel. Only two rods are shown in FIG. 2 and these rods are arranged parallel to one another in two laterally spaced apart holding devices 20 and 21. The distance between holding devices 20 and 21 corresponds to the length of rods 19. Rods 19, for example, can have a length of about 400 mm and a diameter of about 12 mm. Holding devices 20 and 21 are rotatably mounted in the walls of vessel 6, and holding device 20 is drivable by motor 14. Holding device 21 may be connected with holding device 20 via bars (not shown) so that it is carried along during rotation and revolves on a sleeve 22 to which internal anode 12 is fastened. In the illustrated embodiment, two holding devices 20 and 21 are provided. With a greater length of rods 19, it is possible to attach further holding devices along the length of the rods.

Figures 3, 4:
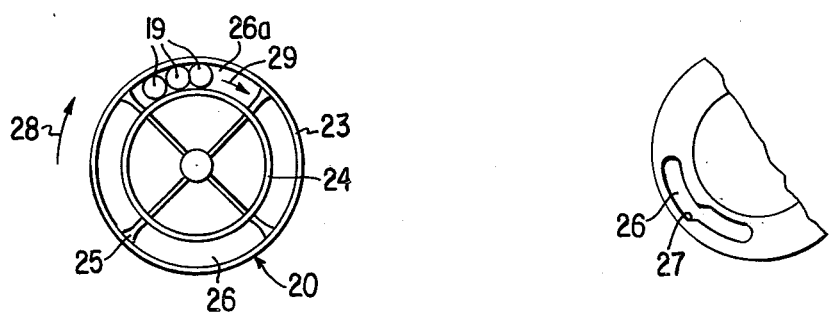
FIGS. 3 and 4 show details of the apparatus of FIG. 2 to an enlarged scale.

Each holding device, as best seen in FIG. 3 with reference to holding device 20, includes two concentric rings, namely, an outer ring 23 and an inner ring 24, and rods 19 are disposed between rings 23 and 24. The gap or space between rings 23 and 24 is advisably subdivided by radially extending bars 25 so that separate chambers 26 result for rods 19, as is shown in principle in the illustration in FIG. 3. The ends of a plurality of rods 19 are inserted in these chambers 26 which extend in the circumferential direction of rings 23 and 24. The number of rods 19 is determined so as to leave chambers 26 partially unfilled, as is shown in FIG. 3 for one chamber 26a which is at the top of the holding device.

If the two rings 23 and 24 of the holding device are now rotated, for example, in the direction of arrow 28, rods 19 will drop inside top chamber 26a in the direction of arrow 29 once the highest point has been passed, and thus strike one another so that metal layers deposited on these rods are struck loose and drop to the bottom of vessel 6 from where they are removed continuously during the process.

This process of the rods 19 hitting one another occurs twice for each chamber per revolution of the holding devices 20 and 21, since the rods 19 also strike one another when each chamber moves upwards again. During this upward movement, however, it is not assured that rods 19 will strike one another if the chamber is smooth, since the rods as a whole may begin to slide. It is therefore recommended to provide a jog-shaped obstruction at least at one point 27 in each chamber 26, as shown in FIG. 4. Obstruction 27 acts as a barrier and permits rods 19 to drop only after they have reached a certain height.

Rods 19 may have a circular or polygonal cross section, the polygonal shape enhancing the breaking loose of the deposited metal layers. Rods 19 may also be tubes with closed end faces. Further, longitudinal grooves may be applied to the surfaces of rods 19 so that no continuous deposit can form which would possibly be more difficult to separate from the rods.

Figures 5, 6:
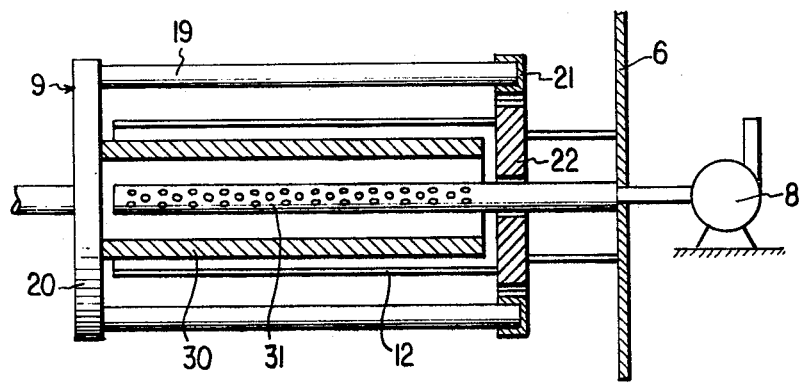
FIG. 5 shows an apparatus as shown in FIG. 2 which has been supplemented by a cathode pile of particles.
FIG. 6 is a schematic representation of a device for removing from the vessel particles of deposited metal which have broken-off from the rods.

For certain metals, particularly if extremely low residual metal contents are to be realized in the waste water, cathode 9 may be additionally equipped with a perforated cage in which a plurality of electrically conductive particles are arranged. This cage may be fastened to one of the holding devices 20 or 21, so that it participates in all movement of cathode 9. FIG. 5 shows such a device in which a cage 30 is disposed within internal anode 12. Cage 30 is comprised of two concentric pipes, and the walls of each of these pipes is perforated all over. Cage 30 is fastened, for example, to holding device 20 and is filled with a plurality of electrically conductive particles. A perforated pipe 31 protrudes into cage 30 and is connected to pump 8 so that the waste water, upon operation of the pump, is sucked or pumped through the particles in cage 30. The other details of the apparatus of FIG. 5 are the same as those of FIG. 2.

If it should be necessary to charge the electrically conductive particle cathode pile in cage 30 with an electrolysis current from both sides, a perforated anode (not shown), for example of expanded metal, may be arranged between cage 30 and pipe 31. This perforated anode may be supplied either from its own current source, in the same manner as anode 12, or it may be connected in parallel with the other anodes.

At the beginning of the process, holding devices 20 and 21 are caused to rotate by switching on motor 14. Thereafter, rectifiers 15 and 16, or only one rectifier in the case where all anodes are connected in parallel, are switched on. To improve the cathode deposition conditions, the waste water may also be turned over in a closed circuit by means of a pump 8 during the entire process. Furthermore, the direction of rotation of the holding devices 20 and 21 may be reversed once or several times during the process. Instead of moving the holding devices by rotating them, any other movement in which the rods are caused to suddenly strike one another is likewise suitable With suitable design of the holding devices, such movement may also be produced, for example, by a vibratory or tumbling process. Since cage 30 is fastened to one of the holding devices, it or the particle pile disposed therein, respectively, participates in all movement of the holding devices. Consequently, the metal layers deposited on the particles of the cathode pile of cage 30 are separated as well, and drop to the bottom of vessel 6 or into a collecting device disposed therein.

The particles of deposited metal struck away from rods 19 are removed from the vessel 6 which contains the waste water 7 to be treated, for example, by means of a device as shown in FIG. 6. As shown in FIG. 6, vessel 6 has a bottom 40 which is lower in the center. Bottom 40 has an opening 41 at its lowest point. Cathode 9 with rods 19, as well as two anodes 10 and 11, are also attached in vessel 6.

A tubular piece 42 is attached to opening 41 in vessel 6 so as to open into a vessel 43 which can be, for example, in the form of a bottle. Particles of struck-away deposited metal leaving opening 41 thus go directly into vessel 43. In the area of bottom 40 of vessel 6, in the interior of the vessel, there are two further pipes 44 and 45 which are rotatable together about a vertical axis 46. These pipes 44 and 45 are connected to a connecting line 47 which is connected to a pump 48. A suction line 49 is provided on the suction side of pump 48 and extends into the waste water 7 within vessel 6. Pump 48 pumps waste water out of vessel 6 and presses it, in the direction of arrow 50, into two pipes 44 and 45. A filter 51 may be inserted into suction line 49 to filter out small solid particles which pump 48 may suck out of vessel 6.

The two pipes 44 and 45, as already mentioned, are rotatable about the vertical axis 46. This rotary movement may be produced externally, for example, by means of a motor. It is just as possible, however, to provide nozzles 52 at the end or somewhere else in the length of pipes 44 and 45 so as to discharge liquid under pressure. The reaction thrust then rotates pipes 44 and 45. The manner in which pipes 44 and 45 are rotated is arbitrary and of no importance for the invention.

Bores 53 are arranged over the entire length of pipes 44 and 45 to act as nozzles through which liquid that has been pressed into the pipes by pump 48 can escape. Bores 53 are provided on the underside of pipes 44 and 45, that is, on its side facing bottom 40 of vessel 6. Advantageously, bores 53 are also provided with a slight slope in the direction toward opening 41 in vessel bottom 40. Correspondingly, the jets of liquid coming out of bores 53 are directed toward vessel bottom 40 in a slightly oblique direction with respect to the center of bottom 40. During rotation of pipes 44 and 45, the discharged liquid jets thus pass over the entire surface of bottom 40 in circular paths, and in this way gradually move the particles of struck-away deposited metal that have dropped from rods 19 of cathode 9 and lie on bottom 40 of vessel 6 in the direction toward opening 41 from where they drop out of vessel 6 through pipe 42.

The pressure with which the waste water or the liquid, respectively, is pressed in the direction of arrow 50 into pipes 44 and 45, must be sufficient to enable the pressure of the liquid jets coming out of bores 53 to indeed push away the particles disposed at bottom 40 of vessel 6. On the other hand, the pressure must not be so high that the particles are whirled up from the bottom of vessel 6 and are thus possibly redissolved again. Due to the hydraulic movement of the particles at the bottom of vessel 6, it is assured that they are moved and are not smeared along vessel bottom 40, as would be the case, for example, if mechanical stirring arms with wipers that slide over the surface of the bottom were used. The hydraulic movement of the particles of deposited metal also prevents unevennesses in vessel bottom 40 from interfering with the discharge of these particles. Use of the process according to the invention thus assures that the particles that have been broken off from rods 19 are removed quickly and completely from the waste water.

In the illustrated embodiments in FIG. 6, there are two pipes 44 and 45 which rotate together in vessel 6. In principle, it is sufficient if only one such pipe is provided which, for reasons of balance, should then be provided with a counterweight. It is also possible, however, to use more than two rotating pipes. Bores 53 in the individual rotating pipes may be oriented to different circular paths so that transport of the particles of deposited metal in the direction toward opening 41 is accelerated. Additionally, it is possible to make the inner diameter of bores 53 acting as nozzles become larger and larger with increasing distance from axis 46, so as to realize in this way a pressure equalization for the discharged liquid jets.

In the preceding text, the openings in rotating pipes 44 and 45 have been called bores 53 which act as nozzles. These bores need not necessarily have a circular cross section, but can also have a different cross-sectional configuration. In principle, it is also possible to place specially designed nozzles into the openings in the rotating pipes 44 and 45. Furthermore, it is possible to provide a valve 54 in pipe section 42 which can be closed, for example, when vessel 43 is exchanged.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

Waste water containing 1.6 g/l zinc, 3.3 g/l sodium cyanide and 7.5 g/l sodium hydroxide is electrolytically substantially dezinced in a first process stage according to the present invention in a demetallization device 3 in the form of a vessel, such as vessel 6 shown in FIG. 2 which serves as an electrolysis cell. Anodes 11 and 12 are made of drawn steel and cathode 9 is comprised of rods 19 made of steel. In this example, the external and internal current circuits are connected in parallel, and the current consumption at a bath voltage of 3.7 V is about 48 A. The waste water bath temperature is about 24° C. Once the zinc content of the waste water has dropped to 0.3 g/l, the electrolysis process is terminated.

At the end of the electrolysis, the treated alkaline waste water solution, whose cyanide content has now dropped to 1.3 g/l, is mixed with a hypochlorite solution in a separate vessel 4, and, and after a reaction period of two hours, has its pH set to 4 by the addition of sulfuric acid. The weakly acid waste water is then charged into ion exchanger 5 where it is conducted over a cation exchanger in sodium form of the type of carbonic acid. Practically all of the zinc is removed from the waste water in ion exchanger 5, and the waste water leaves ion exchanger 5 with an approximately neutral pH. The cation exchanger is regenerated with sulfuric acid. The regenerated solution which developes during the regeneration with sulfuric acid is rich in zinc, is diluted with soda liquor and is then returned to the electrolysis cell 6 for removal of the zinc.

EXAMPLE 2

Waste water containing 3.8 g/l silver and 8.6 g/l sodium cyanide is mixed with 3 g/l caustic soda and introduced into vessel 6 which serves as an electrolysis cell. Strips of graphite serve as anodes 11 and 12, and the cathode is comprised of rods 19 of stainless steel. The anodes 11 and 12 are connected in parallel, and the current consumption at a bath voltage of 7.2 V is 60 A. The waste water bath temperature lies at 26° C. If the electrolysis is effected without a bulk cathode 30, the silver content drops to 7 mg/l. If a bulk cathode 30 such as shown in FIG. 5 and having a cathode fill of M 10 nuts of stainless steel is used in addition, through which the waste water flows at about 2 liters per second, the silver content of the waste water can be reduced electrolytically to less than 1 mg/l.

During the electrolysis process, cyanide decontamination takes place at the anode which is substantially accelerated by the addition 3 g/l of sodium chloride to the waste water. After terminating the electrolysis, the remaining cyanide is decontaminated in the alkaline solution by the addition of hypochlorite in decontamination vessel 4. The waste water is thereafter neutralized and discharged.

EXAMPLE 3

Waste water containing 6.5 g/l copper in the form of a sulfate and 8 g/l free sulfuric acid is electrically freed from the copper in a first process stage in vessel 6 to about 150 mg/l. The material for anodes 11 and 12 is lead, and the cathode is comprised of rods 19 of stainless steel. The anodes 11 and 12 are connected in parallel, and the current consumption at a bath voltage of 4.2 V is 55 A. The waste water bath temperature is about 25° C. When the intended copper content of 150 mg/l has been reached, the electrolysis is terminated, the pH of the waste water is set at 4.8 with the addition of soda liquor and the solution is conducted over a weakly acid cation exchanger in the sodium form. The neutral, decoppered waste water is discharged. Diluted sulfuric acid is used to regenerate the ion exchanger. The regenerated solution which develops during the regeneration with sulfuric acid is returned to the electrolysis stage in vessel 6.

It will be understood that the above description of the present invention is susceptible to various modifications, changes and adaptations, and the same are intended to be comprehended within the meaning and range of equivalents of the appended claims.

What is claimed is:

1. Method for treating metal containing waste waters while employing a vessel containing the waste water in which there is disposed at least one anode and one cathode comprised of a plurality of electrically conductive elements and in which the waste water is subjected to electrolysis during which the cathode elements are moved, comprising:
   (a) providing the cathode elements in the form of rods;
   (b) arranging the rods in the vessel by means of at least two holding devices so that they extend parallel to one another and can be moved in the holding devices relative to one another; and
   (c) moving the holding devices during the electrolysis process so that the rods strike one another again and again at spaced intervals.

2. Method as defined in claim 1 wherein the holding devices are rotated about their axis in one direction.

3. Method as defined in claim 1 wherein the holding devices are rotated about their axis in one direction, and the direction of rotation is reversed at least once during the process.

4. Method as defined in claim 1 wherein the waste water is moved during the movement of the holding devices while simultaneously producing a forced flow relative to the rods.

5. Method as defined in claim 1 wherein the waste water is pumped out of the vessel and back into it in a closed circuit.

6. Method as defined in claim 1 wherein metal from the waste water is deposited on the rods, particles of the deposited metals are separated from the rods due to the striking action of the rods, and these particles are removed from the vessel during the process.

7. Method as defined in claim 6 wherein the particles are removed from the bottom of the vessel.

8. Method as defined in claim 6 wherein the particles are removed from a collecting device provided in the vessel.

9. Method as defined in claim 1 wherein the waste water being treated in the vessel is conducted, after termination of the electrolysis process, over an ion exchanger, the ion exchanger is regenerated, and the solution which develops during the regeneration is returned to the vessel.

10. Method as defined in claim 1 wherein metal from the waste water is deposited on the rods, particles of the deposited metal are separated form the rods by the rods striking one another and drop to the bottom of the vessel, and these particles are removed from the vessel during the electrolysis process by means of rotating jets or liquid which are directed toward the bottom of the vessel.

11. Method as defined in claim 10 wherein the particles are moved to an opening disposed in the vessel bottom by means of the liquid jets, the liquid jets emanate from at least one pipe disposed at the bottom of the vessel, and the particles are removed from the vessel through said opening.

12. Method as defined in claim 8 wherein the liquid jets are produced by means of a pump which is connected to a suction line extending into the waste water and to a connecting line which extends into the opening in the bottom of the vessel.

* * * * *